Aug. 31, 1937. O. N. GREDELL 2,091,731
TANK
Filed April 30, 1934 2 Sheets-Sheet 1
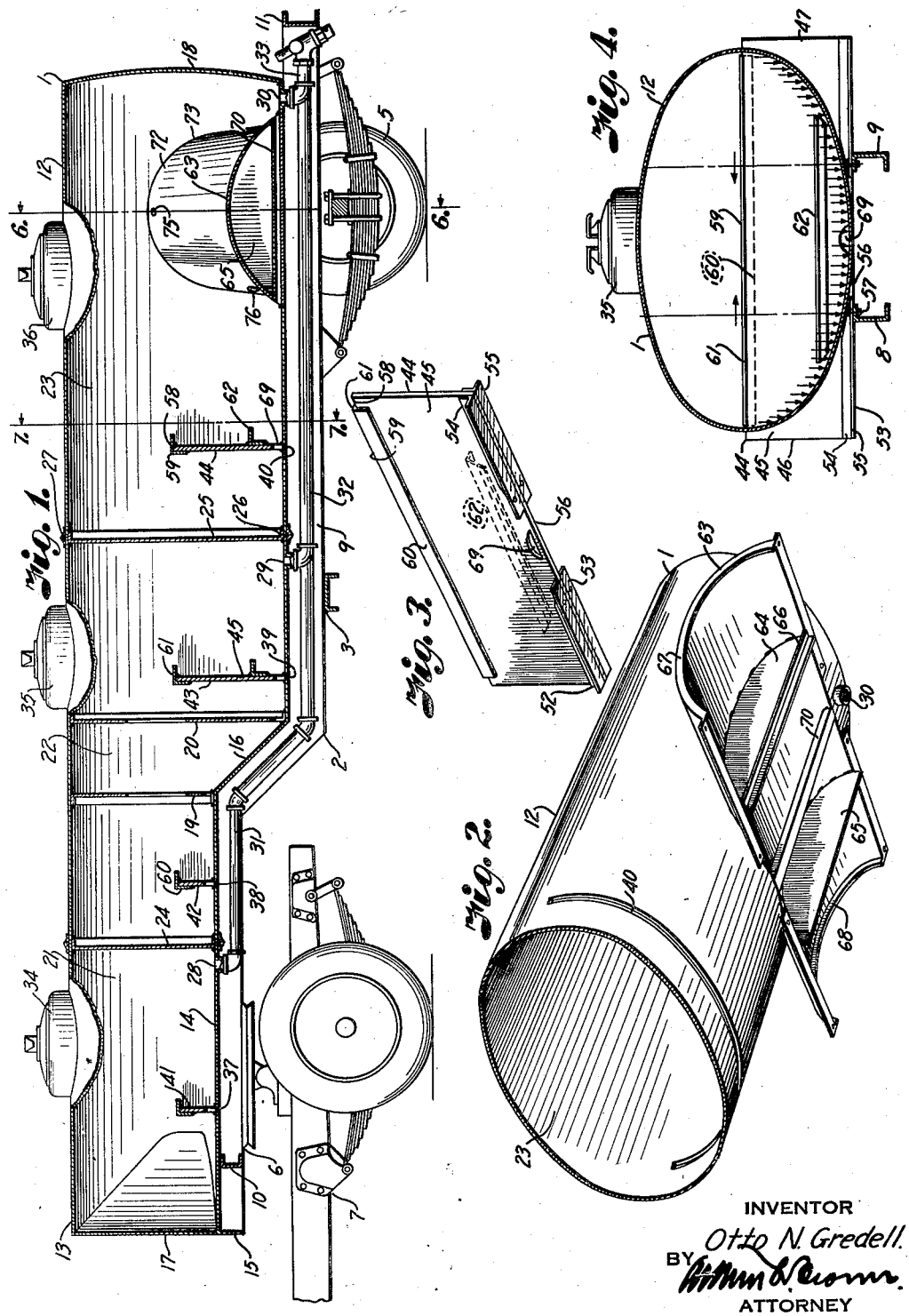
INVENTOR
Otto N. Gredell.
BY
ATTORNEY

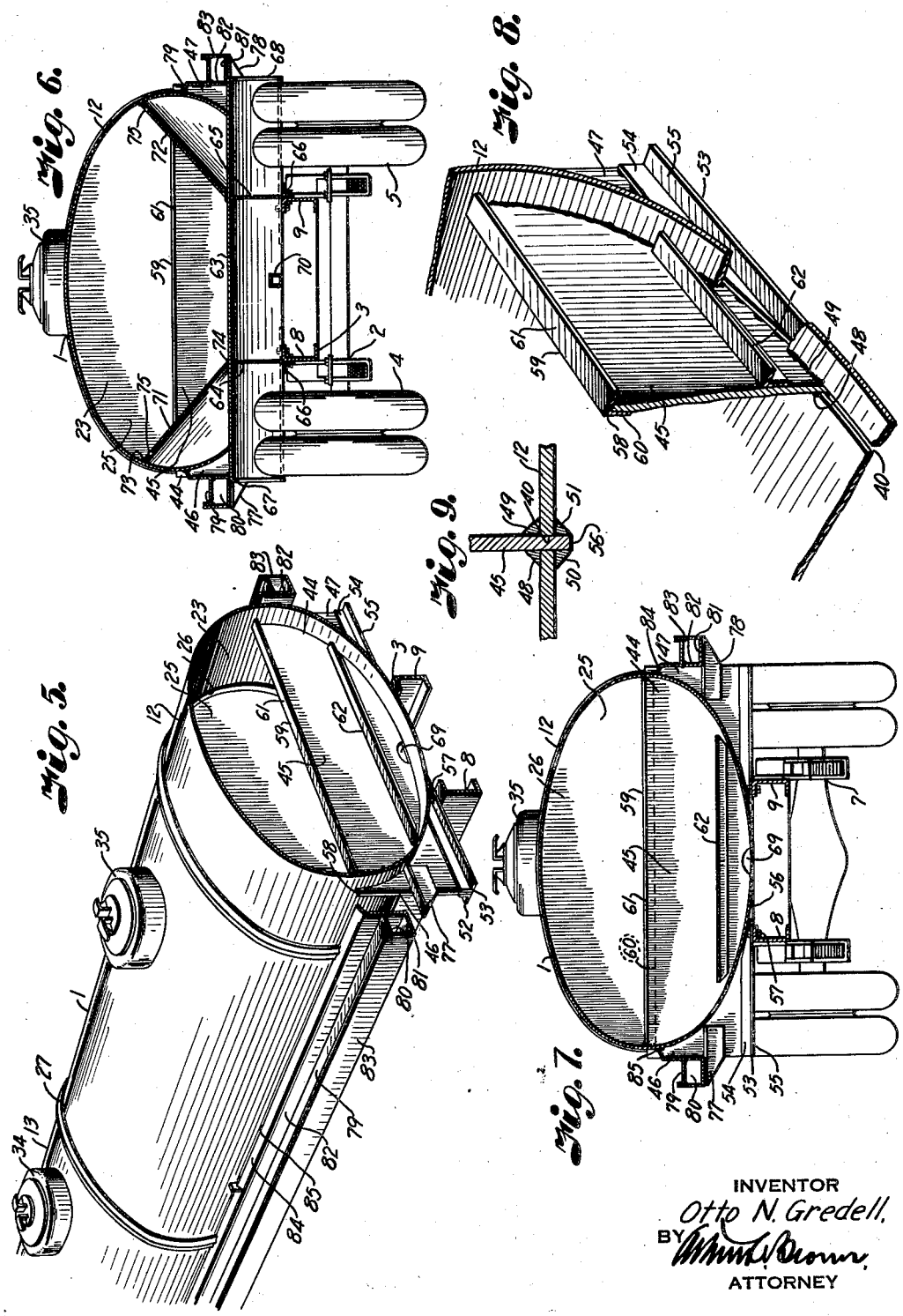

Patented Aug. 31, 1937

2,091,731

UNITED STATES PATENT OFFICE 2,091,731

TANK

Otto N. Gredell, Kansas City, Mo., assignor to Standard Steel Works, North Kansas City, Mo., a corporation of Missouri Application April 30, 1934, Serial No. 723,064

13 Claims. (Cl. 220—22)

This invention relates to tanks and particularly to those employed in transporting fluids and has for its principal objects to provide a tank of this character having higher strength weight ratio, to provide a simpler construction, to facilitate assembly, and to provide a construction affording an extremely low center of gravity.

It is also an important object of the invention to provide a tank with a wheel housing which serves the additional purpose of a cross girder.

In accomplishing these and other objects of the invention, hereinafter described, I have provided improved details of structure, the preferred forms of which are illustrated in the accompanying drawings, wherein:

Fig. 1 is a vertical longitudinal sectional view through a tank constructed in accordance with the present invention.

Fig. 2 is a detail perspective sectional view of the rear portion of the tank particularly illustrating the wheel housing which forms a rear support and showing a slot formed in the body portion of the tank for mounting one of the forward cross girders.

Fig. 3 is a detail perspective view of one of the cross girders.

Fig. 4 is a vertical cross sectional view through the tank showing the load distribution on the tank bottom and direction of forces acting on one of the cross girders.

Fig. 5 is a detail perspective sectional view of a portion of the tank showing one of the cross girders in position.

Fig. 6 is a vertical cross sectional view of the tank taken through the wheel housing on the line 6—6, Fig. 1.

Fig. 7 is a cross sectional view of the tank on the line 7—7, Fig. 1.

Fig. 8 is a detail fragmentary perspective view of the tank particularly illustrating the method of connecting the cross girders to the wall of the tank.

Fig. 9 is an enlarged section through the juncture of the tank with a girder illustrating the position of the welds.

Referring more in detail to the drawings:

To illustrate my invention, I have shown it as carried out in the trailer truck tank 1 that is mounted on a trailer 2 including a frame 3 having its rear ends carried by wheels 4 and 5 and its forward end provided with an upwardly offset portion 6 whereby the trailer is connected with a tractor vehicle 7, as in conventional trailer practice. In the illustrated instance the trailer frame includes spaced longitudinal channels 8 and 9 connected at their ends by cross channels 10 and 11.

In designing vehicle tanks, it is best engineering practice to keep the tare weight thereof at as low a value as possible consistent with strength in order that a minimum power of the tractor vehicle is consumed in transportation of nonproductive weight to enable haulage of larger remunerative loads.

The capacity of a truck tank, however, has a definite bearing upon weight, for the reason that as the capacity increases, the weight is increased in greater proportion, due to the heavier materials and added bracing required to maintain the necessary strength of construction. Thus, in the present construction, there is a definite relation between weight and strength of construction.

In carrying out the present invention, I may construct the tank of lighter gage material and provide a novel construction wherein the strength of the tank is increased to compensate for the lighter gage of material so as to maintain a high strength weight ratio.

In conformance with the present invention, the body of the tank 1 is formed of light gage sheet metal and includes a rear portion 12 of substantially elliptical cross section and a forward portion 13 having its upper part forming a continuation of the upper portion of the rear of the tank, but its lower part is cut away and the sides thereof are connected by a substantially horizontal bottom sheet 14 in the horizontal plane of the offset in the trailer frame.

To enhance the appearance of the tank, the side walls thereof may be extended below the bottom sheet to form a skirting 15 for concealing the trailer connection with the tractor vehicle as well as to conceal the disagreeable effect of the offset portion of the tank.

The bottom sheet 14 is connected to the bottom wall portion of the body of the tank at the offset by an inclined sheet 16 to complete top, bottom and side wall structure of the tank. The front and rear ends of the tank are closed by end sheets 17 and 18, the front sheets 17 being curved and connected with the side and bottom walls of the tank to form a rounded end to accommodate the turning radius of the trailer relatively to the tractor vehicle.

To strengthen the juncture of the offset portion of the tank with the main body portion thereof, I provide transverse false bulk heads 19 and 20 having their peripheries welded to the walls of the tank as shown in Fig. 1. The interior of the tank may also be divided into compartments 21, 22 and 23 by bulk heads 24 and 25 having the same dimensions as the cross section of the tank at the points in which they are installed. Due to the length of the tank, the walls thereof are formed of sheets having their ends supported and welded to lateral flanges 26 that are provided on the bulk heads. After welding, the seams are then covered by ornamental bands 27 extending circumferentially of the tank and having their side edges overlying the adjacent sheets.

The bottoms of the tank compartments are provided with suitable drain connections 28, 29 and 30 that are connected with flow lines 31, 32 and 33 leading to the rear of the tank and the top walls thereof are provided with domes 34, 35 and 36 having man holes, as in conventional practice.

The tank thus described comprises a welded, leak proof shell, but the structure in itself is not sufficiently strong to withstand the weight of the fluid carried therein or the torsional stresses and strains as applied to the tank through flexing of the trailer frame.

Ordinarily, such tanks are reinforced by tubular stringers, cross bracing, and lateral and transverse surge plates, to support the walls of the tank from collapse under working loads. These reinforcing members, however, add materially to the weight of the tank and, therefore, increase the tare of the vehicle.

It has also been the practice to provide means for supporting the tank on the trailer frame, such as bolsters, longitudinal sills or saddle members, and these members also add to the tare and also serve to raise the center of gravity the depth of the bolsters, due to the fact that they are usually supported on the trailer frame and the tank is mounted on their upper edges.

In carrying out the present invention, I provide supports for the tank which are so incorporated in the construction thereof that they adequately support the wall structure without any additional bracing. The supports are also mounted relatively to the tank so that they do not increase the height of its center of gravity. The supports also serve the purpose of surge and like plates that are mounted interiorly of a tank to prevent sudden rush of fluid from one end of a compartment to another in the same manner as the conventional surge plates above referred to.

By thus constructing the tank supports to effect these functions, I am enabled to greatly reduce the weight of the tank and at the same time provide a stronger tank construction, as now to be described.

In carrying out this feature, the lower walls of the tank are provided with transverse slots 37, 38, 39 and 40 located in spaced and independent relation to the end walls 17 and 18 and partitions or bulk heads 24 and 25, as shown in Fig. 1.

The slots extend through the bottom portion of the tank and terminate at substantially the horizontal diameter thereof for mounting the supports which comprise transverse girders 41, 42, 43 and 44, respectively.

The girders are best illustrated in Fig. 3 and include flat plates 45 that are mounted in the slots and are of sufficient length to project from the sides of the tank, as at 46 and 47, Fig. 4, and of sufficient depth to extend slightly below the bottom wall of the tank to substantially the horizontal diameter thereof. When inserted in the slots, the plates are welded on the inner and outer sides of the tank and to both sides of the girders, as shown at 48, 49, 50 and 51, Fig. 9.

To provide footing for the lower edge of the plates that rest upon the longitudinal sills of the trailer frame, each plate is provided with pairs of angles 52 and 53 arranged with their vertical flanges 54 in engaging relation with the side faces of the plates and their horizontal flanges 55 coinciding with the horizontal lower edge 56 thereof for support on the channels 8 and 9, as illustrated in Figs. 3 and 4.

The angles preferably do not extend completely across the length of the girders, but terminate short of the center portion of the tank whereby its lower wall is supported in tangential relation to the plane of the trailer frame so as to maintain the center of gravity of the tank as low as possible.

The horizontal flanges of the angles may be provided with suitable openings for passing bolts 57 or other means whereby the tank is secured to the sills of the trailer frame. The plates 45 thus form girders for supporting the tank and the weight of the liquid therein acting against the lower wall as shown by the arrows, Fig. 4.

Due to the fact that the lower wall portion of the tank is welded to the plates, it adequately supports the weight of the liquid carried thereon.

If the trailer frame is relatively wide, and the channels engage the girders at points adjacent the ends thereof, there is a tendency for the compressional stresses in the girder to cause buckling of the upper edges of the plates.

I, therefore, provide the upper edge 58 of each girder plate with a stiffening or compression member such as an angle 59 having one flange 60 engaging against and secured to one face of the plate and its other flange 61 overlying the upper edge thereof to resist tendency of the plate to buckle under compression.

The load acting on the bottom of the tank also causes tensional strains to be imparted to the lower edges of the plates at points between the sides of the trailer frame and I, therefore, provide the plates with tension members comprising bars 62 which are welded or otherwise secured to one side of the girder plates and which are of sufficient length to extend completely across the width of the tank at the points of attachment. The tension members preferably extend over the inner ends of the pairs of footing angles 52 and 53 previously described.

On narrower trailer frames where the tank is supported closer to its center, the upper edges of the girder plates are placed in tension and the lower edges in compression so that the members just described are transposed from compression to tension members respectively.

The ideal condition is to so locate the side frames of the trailer that the strains acting on the upper edges of the girder are slightly on the tension side so as to resist outward bulging of the sides of the tank and to support the roof portion against distortion under lateral surging of the fluid.

In a tank employing the inset girders extending through the interior of the tank as above described, means must be provided in the tank for accommodating the upper periphery of the wheels of the trailer vehicle. This is accomplished by providing the tank with a wheel housing 63 comprising an arcuate shaped sheet extending transversely of the tank and having its upper arcuate portion welded into an arcuate opening provided to receive it.

The wheel housing also forms the important function of serving as one of the rear girders and also rigidly reinforces the walls of the tank at the point of greatest stresses.

The arcuate shaped sheet is reinforced adjacent the edges of the side frames of the trailer by transverse web plates 64 and 65 having their upper edges welded to the inner periphery of the sheet, the lower edges being reinforced with angle irons 66 extending in parallel relation with the upper edges of the trailer side members, as clearly illustrated in Figs. 2 and 6.

The outer ends of the wheel housing extend beyond the outer side face of the tractor wheels and are flanged inwardly as at 67 and 68 to stiffen the ends thereof and to take the place of the usual mud guards which are employed over the wheels to protect the sides of a tank.

In order that the fluid may flow from one end of each compartment to the other, the girder plates are provided with openings 69 that are located near the bottom wall portions of the tank in the center thereof, as shown in Figs. 1, 5 and 7.

The wheel housing is also provided at its central point with a conduit 70 extending from one side thereof to the other as shown in Figs. 1 and 2 to allow the fluid to drain from the forward end of the rear compartment to the outlet 30.

Owing to the fact that the wheel housing does not extend in height to the horizontal center of the tank, the rounded sides of the tank are partly unsupported, and to overcome this defect and at the same time increase the strength of the tank over the rear wheel supports, I provide angle brackets 71 and 72. The brackets 71 and 72 are preferably curved sheets of metal arranged at outwardly and upwardly diverging angles relatively to the top of the wheel housing, the upper and lower edges of the sheets being cut on arcs to conform to the side walls of the tank and the curve of the wheel housing respectively, so that they can be welded thereto as shown at 73 and 74. In order to avoid losing capacity in the tank because of the brackets, the upper portions are provided with vent openings 75 and their lower portions with drain ports 76 to permit flow of fluid therethrough when filling or emptying the tank.

The ends of the girders may be provided with suitable brackets 77 and 78 for mounting walk ways 79, barrel racks, and other tank accessories. The walk ways 79, in the illustrated instance, are formed of sheet metal plates to provide hose housings 80 extending longitudinally of the tank and which have horizontal bottom portions 81 supported on the brackets 77 and 78 and vertical side wall portions 82 and 83 extending longitudinally of the tank and supporting the walk ways 79 therebetween as clearly illustrated in Fig. 5.

The inner side wall portion 82 at each side of the tank preferably extends above the walk way and carries an inwardly extending lateral flange 84 that abuts against the wall of the tank, as at 85.

The walk ways and hose housings extend to the end sheet 17 where they join the skirting 15 which may be an extension of the end sheet.

In assembling a tank constructed as described, the wall sheets are assembled and welded to the bulk heads and end and partition sheets to form a leak proof housing. The girder slots are then formed in the bottom and side walls of the tank and an opening is also formed for the wheel housing. The girder plates are then inserted through the girder slots and welded to the shell of the tank, as shown in Fig. 9, after which the tension and compression members are applied. The wheel housing is then welded in position to complete the tank supports.

The various tank fittings, walk ways, hose housings, can racks, etc., are then installed in their desired position and the tank mounted on the trailer frame with the girders resting on the side frames in the position at which it is to be attached.

By thus connecting the tank walls to the girders, the girders positively support the tank across the entire length thereof and there is no way in which the tank can become loosened from its supports.

The girders may also be placed in any desired point in the shell of the tank to accommodate any spacing made necessary by the particular trailer frame on which the tank is to be mounted.

The tank is also of stronger construction and is of lighter weight for a given capacity because of my improved mounting.

What I claim and desire to secure by Letters Patent is:

1. A tank, means for supporting the tank including an arcuate shaped girder member inset transversely of the tank, and a conduit having its ends connecting opposite sides of the girder member for movement of fluid from one side of the girder member to the other.

2. A tank including a horizontal tubular body having an arcuate shaped opening extending transversely of the bottom of said body, and a transverse girder having arcuate shaped cross section welded into said opening and having ends projecting from said opening at the sides of the tubular body to provide bearing portions.

3. A tank including a horizontal tubular body having an arcuate shaped opening extending transversely of the bottom of said body, a transverse girder having arcuate shaped cross section welded into said opening and having ends projecting from said opening at the sides of the tubular body to provide bearing portions, and brackets conforming to the shape of the girder and having ends thereof welded to the inner portion of the body and to said girder.

4. A tank including a horizontal tubular body having an arcuate shaped opening extending transversely of the bottom of said body, a transverse girder having arcuate shaped cross section welded into said opening and having ends projecting from said opening at the sides of the tubular body to provide bearing portions, brackets conforming to the shape of the girder and having ends thereof welded to the inner portion of the body and to said girder, and plates extending transversely of the girder at substantially the points of attachment of the brackets with the girder.

5. A tank including a horizontally arranged tubular body portion having a transverse opening in the bottom thereof, a girder welded into said opening and having bearing portions intermediate its ends and its upper portion spaced from the top of said body portion, and a compression member connected with said upper portion of the girder for taking up compression strains acting on said girder incidental to support of the tank on said bearing portions of the girder.

6. A tank including a horizontally arranged tubular body portion having a transverse opening in the bottom thereof, a girder welded into said opening and having bearing portions intermediate its ends and its upper portion spaced from the top of said body portion, a compression member connected with said upper portion of the girder for taking up compression strains acting on said girder incidental to support of the tank on said bearing portions of the girder, and a tension member fixed to the girder below said compression member.

7. A tank including a horizontally arranged tubular body having an elongated opening extending transversely across the bottom portion of the tank, a girder inset in said opening with its upper portion extending above said bottom portion and spaced from the top portion of the tank, and bearing supports on the girder having bearing faces located in a plane tangential to the bottom portion of the tank.

8. A tank including a horizontally arranged tubular body having an elongated opening extending transversely across the bottom portion of the tank, a girder inset in said opening with its upper portion extending above said bottom portion and spaced from the top portion of the tank, and bracing means connected with the top portion of the girder for resisting compression loads acting on said girder.

9. A tank including a horizontally arranged tubular body, partitions dividing the body into separate compartments, and a girder inset transversely of the tubular body at a point between said partitions for supporting the tank and having upper portions projecting into said compartments and spaced from the top portion of the tubular body to protect the partitions from surge effects of the fluid contained in the compartments.

10. A tank including a horizontally arranged tubular body, partitions dividing the body into separate compartments, girders inset transversely of the tubular body at points between said partitions for supporting the tank and having upper portions projecting into said compartments and spaced from the top portion of the tubular body to protect the partitions from surge effects of the fluid contained in the compartments, and tubular bracing means connecting ends of the girders exteriorly of the tank.

11. In combination with a supporting member, a tank, transverse partitions dividing the tank into separate compartments, and girder members comprising plate portions inset in the tank independently of the partitions and having upper portions spaced from the top of the tank and lower edges extending at a tangent to the body of the tank for mounting the tank on said supporting member.

12. In combination with a supporting member, a tank having substantially elliptical cross section, transverse partitions dividing the tank into separate compartments, girder members comprising plate portions inset in the tank in spaced relation to the partitions and having upper portions spaced from the top of the tank and lower edges extending at a tangent to the bottom of the tank, and footing members on said edges having bearing surfaces in the plane of said tangent for seating the girder members on said supporting member.

13. A tank including a horizontally arranged tubular body, an arcuate shaped girder inset transversely of the bottom portion of said body and having its crown portion extending into the body above said bottom portion, and parallel foot portions on the girder extending exteriorly of the body for supporting the tank.

OTTO N. GREDELL.